(12) United States Patent
Hayashi et al.

(10) Patent No.: US 6,194,993 B1
(45) Date of Patent: Feb. 27, 2001

(54) READER AND/OR WRITER APPARATUS, POWER FEEDING SYSTEM, AND COMMUNICATION SYSTEM

(75) Inventors: Yoshihiko Hayashi, Tokyo; Takashi Suga; Kouichi Uesaka, both of Yokohama; Ryouzou Yoshino, Hadano; Keisuke Igarashi, Hamura, all of (JP)

(73) Assignees: Hitachi, Ltd.; Kokusai Electric Co., Ltd., both of Tokyo (JP)

( * ) Notice: Subject to any disclaimer, the term of this patent is extended or adjusted under 35 U.S.C. 154(b) by 0 days.

(21) Appl. No.: 09/100,325

(22) Filed: Jun. 19, 1998

(30) Foreign Application Priority Data

Jun. 20, 1997 (JP) .................................................. 9-164759

(51) Int. Cl.$^7$ .................................................. H04Q 5/22
(52) U.S. Cl. .................................. 340/10.34; 340/825.34; 235/435; 235/439; 235/492; 343/702; 343/895
(58) Field of Search .............................. 340/10.1, 825.34, 340/572.5, 825.31, 10.34; 235/435, 487, 492, 380; 343/702, 895; 375/316, 259

(56) References Cited

U.S. PATENT DOCUMENTS

| | | | |
|---|---|---|---|
| 4,583,099 | * | 4/1986 | Reilly et al. ........................ 343/895 |
| 5,347,263 | * | 9/1994 | Carroll et al. .................. 340/825.31 |
| 5,418,353 | * | 5/1995 | Katayama et al. .................... 235/380 |
| 5,574,470 | * | 11/1996 | De Vall ................................ 343/895 |
| 5,670,772 | * | 9/1997 | Goto .................................... 235/435 |
| 5,671,254 | * | 9/1997 | Nagata et al. ....................... 375/326 |
| 5,698,838 | * | 12/1997 | Yamaguchi ......................... 235/492 |
| 5,781,110 | * | 7/1998 | Habeger, Jr. et al. ............ 340/572.5 |
| 5,923,301 | * | 7/1999 | Chen .................................... 343/795 |
| 5,930,304 | * | 7/1999 | Hollenbeck et al. ............... 375/316 |
| 5,936,584 | * | 8/1999 | Lawrence et al. .................. 343/702 |
| 5,949,823 | * | 9/1999 | Suga et al. .......................... 375/256 |

\* cited by examiner

*Primary Examiner*—Brian Zimmerman
*Assistant Examiner*—Yves Dalencourt
(74) *Attorney, Agent, or Firm*—Antonelli, Terry, Stout & Kraus, LLP

(57) ABSTRACT

A reader and/or writer apparatus, a power feeding system and a power feeding and communication transmission and/or reception system in a proximate wireless card system arranged so that power which satisfies the requirement of the Radio Law (500 $\mu$V/m at a distance of 3 m from the reader and/or writer apparatus) regarding the radiated electric field is supplied sufficiently from the reader and/or writer apparatus to the proximate wireless card (IC card). The reader and/or writer apparatus has a spirally shaped or coil-shaped antenna for generating electromagnetic fields both to supply operational power to an IC card and to perform transmission and/or reception of signals for communication to and/or from the IC card and a conductor member for forming a mirror image of the antenna on its back side.

29 Claims, 9 Drawing Sheets

[1] POWER FEEDING WAVE

[2] MODULATED WAVE FOR DATA COMMUNICATION

ELECTRIC FIELD INTENSITY VS. VERTICAL DISTANCE
FROM READER AND/OR WRITER ANTENNA

READER AND/OR WRITER APPARATUS, POWER FEEDING SYSTEM, AND COMMUNICATION SYSTEM

BACKGROUND OF THE INVENTION

The present invention relates to a reader and/or writer apparatus, a power feeding system and a communication system for performing power feeding for proximate wireless operation and communication between, for instance, a cash dispenser, electronic money, an automatic ticket checking system, a room entrance/exit management system or a pay telephone and a proximate wireless card, such as a cash card, a credit card, a passenger ticket, a commuting ticket, a coupon ticket, a control card, an IC card, a license or a telephone calling card.

It is already known that, by using light or a magnetic field, electric power can be supplied in a non-contact manner from the power feeding side to a proximate wireless card (IC card).

For example, Japanese Patent No. 2626882 (JP-A-8-263609) discloses a technique related to disposing a metal plate on a back of a coil-shaped antenna to prevent wrong operation such as reading card data from a back of a non-contact card reader, especially a technique for adjusting a distance between the metal plate and the coil-shaped antenna in consideration of the fact that the resonant frequency shifts when the metal plate is disposed.

In non-contact card systems (proximate wireless card systems), cash cards, credit cards, passenger tickets, commuting tickets and the like for use at the gates of railway stations, on buses and exit/entrances are made as IC cards. When the user of such an IC card causes the IC card to pass in a non-contact manner through a reader/writer provided at the gate of a railway station, on a bus or at an exit/entrance, a power feeding wave or a communication wave is radiated from a coil or an antenna of the reader and/or writer, this electromagnetic wave is received and induced by a coil or an antenna on the card side to actuate a circuit on the card side and to detect a signal. In this case, an electric field radiated from the coil or antenna of the reader and/or writer should satisfy the requirement of the Wireless Telegraphy Act (500 $\mu$V/m at a distance of 3 m from the reader and/or writer).

However, there is involved the problem that, as the aforementioned requirement of the Wireless Telegraphy Act (500 $\mu$V/m at a distance of 3 m from the reader and/or writer) regarding the radiated electric field determines the upper limit of the amperage of the coil or antenna for the reader and/or writer and hence the upper limit of power feeding, it is difficult to feed sufficient power to the IC card. That is, there is involved the problem that sufficient power feeding from the reader and/or writer to the IC card at a desired distance from the reader and/or writer and suppression of a far field prescribed in the Wireless Telegraphy Act is difficult.

SUMMARY OF THE INVENTION

In order to solve the aforementioned problems, a first object of the present invention is to provide a reader and/or writer apparatus, a power feeding system and a communication system in a proximate wireless card system arranged so that power which satisfies the requirement of the Wireless Telegraphy Act (500 $\mu$V/m at a distance of 3 m from the reader and/or writer apparatus) regarding the radiated electric field can be supplied sufficiently from the reader and/or writer apparatus to the proximate wireless card (IC card).

A second object of the invention is to provide a reader and/or writer apparatus, a power feeding system and a communication system in a proximate wireless card system which performs high-efficiency power feeding by making acceptable an error in the positioning of the IC card proximate to an antenna provided on the reader and/or writer apparatus.

In order to achieve the first object, according to one aspect of the present invention, a reader and/or writer apparatus has of a spirally shaped or coil-shaped antenna for generating an electromagnetic field to supply operational power to an IC card, and a conductor member for forming a mirror image of the antenna.

According to another aspect of the present invention, a reader and/or writer apparatus has a spirally shaped or coil-shaped antenna for generating electromagnetic fields both to supply operational power to an IC card and to transmit and/or receive signals for communication to/from the IC card, and a conductor member for forming a mirror image of the antenna.

The just-mentioned the reader and/or writer apparatus according to the present invention comprises a power supply for generating a signal for power feeding, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power feeding circuit for feeding power to an antenna on the basis of a signal obtained from the modulator.

According to still another aspect of the present invention, a reader and/or writer apparatus has a spirally shaped or coil-shaped antenna for generating an electromagnetic field to supply operational power to an IC card and a spirally shaped or coil-shaped image antenna which constitutes a mirror image of the former antenna.

According to yet another aspect of the present invention, a reader and/or writer apparatus has a spirally shaped or coil-shaped antenna for generating electromagnetic fields both to supply operational power to an IC card and to transmit and/or receive signals for communication to/from the IC card and a spirally shaped or coil-shaped image antenna which constitutes a mirror image of the former antenna.

The just-mentioned reader and/or writer apparatus according to the invention comprises a power supply for generating a signal for power feeding, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power feeding circuit for feeding power to an antenna and an image antenna on the basis of a signal obtained from the modulator.

According to yet another aspect of the present invention, a power feeding system for feeding power, using electromagnetic waves, from a reader and/or writer apparatus to an IC card, for converting, in the IC card, the fed power to a D.C. voltage and for supplying this D.C. voltage to an internal circuit of the IC card, is provided wherein the reader and/or writer apparatus has a spirally shaped or coil-shaped antenna for generating an electromagnetic field to supply operational power to the IC card and a conductor member for forming a mirror image of the antenna.

According to still another aspect of the present invention, a communication system for feeding power, using electromagnetic waves, from a reader and/or writer apparatus to an IC card and for performing transmission and/or reception of signals for communication to and/or from the IC card, is provided. wherein the reader and/or writer apparatus has a spirally shaped or coil-shaped antenna for generating an electromagnetic field both to supply operational power to the IC card and to perform transmission and/or reception of signals for communication to and/or from the IC card and a conductor member for forming a mirror image of the antenna.

According to yet another aspect of the present invention, a power feeding system for feeding power, using electromagnetic waves, from a reader and/or writer apparatus to an IC card, for converting, in the IC card, the fed power to a D.C. voltage and for supplying this D.C. voltage to an internal circuit of the IC card, is provided wherein the reader and/or writer apparatus has a spirally shaped or coil-shaped antenna for generating an electromagnetic field to supply operational power to the IC card and a spirally shaped or coil-shaped image antenna which constitutes a mirror image of the former antenna.

According to still another aspect of the present invention, a communication system for feeding power, using electromagnetic waves, from a reader and/or writer apparatus to an IC card and for performing transmission and/or reception of signals for communication to and/or from the IC card, is provided wherein the reader and/or writer apparatus has a spirally shaped or coil-shaped antenna for generating an electromagnetic field both to supply operational power to the IC card and to perform transmission and/or reception of signals for communication to and/or from the IC card and a spirally shaped or coil-shaped image antenna which constitutes a mirror image of the former antenna.

In the just-mentioned communication system, the reader and/or writer comprises a power supply for generating a signal for power feeding, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power feeding circuit for feeding power to an antenna and an image antenna on the basis of a signal obtained from the modulator.

According to still another aspect of the present invention, a reader and/or writer apparatus has an antenna for generating an electromagnetic wave to feed power to an IC card, and a conductor member disposed so that a·tan θ is 0.2 or less where $a$ is a dimension of the antenna in a position where the distance between an outermost element of the antenna and an edge of the conductor member is minimum and θ is an angle formed between the conductor member and a line which connects the outermost component of the antenna with the edge of the conductor member.

In the just-mentioned reader and/or writer apparatus, the antenna both feeds power to the IC card and performs transmission and/or reception of a communication signal to and/from the IC card.

According to still another aspect of the present invention, a power feeding system for feeding power, using electromagnetic waves, from a reader and/or writer apparatus to an IC card, for converting, in the IC card, the fed power to a D.C. voltage and for supplying this D.C. voltage to an internal circuit of the IC card, is provided wherein the reader and/or writer apparatus has an antenna for generating an electromagnetic field to supply operational power to the IC card and a conductor member disposed so that a·tan θ is 0.2 or less where $a$ is a dimension of the antenna in a position where the distance between an outermost component of the antenna and an edge of the conductor member is minimum and θ is an angle formed between the conductor member and a line which connects the outermost component of the antenna with the edge of the conductor member.

According to still another aspect of the present invention, a communication system for feeding power, using electromagnetic waves, from a reader and/or writer apparatus to an IC card and for performing transmission and/or reception of signals for communication to and/or from the IC card, is provided wherein the reader and/or writer apparatus has an antenna for generating an electromagnetic wave to feed power to the IC card, and a conductor member disposed so that a·tan θ is 0.2 or less where $a$ is a dimension of the antenna in a position where the distance between an outermost element of the antenna and an edge of the conductor member is minimum and θ is an angle formed between the conductor member and a line which connects the outermost component of the antenna with the edge of the conductor member.

According to a feature of the present invention, a spirally shaped or coil-shaped antenna for generating an electromagnetic wave to feed power to an IC card and a conductor member for forming a mirror image of the antenna to suppress an electric field intensity at a position at least 3 meters distant from the antenna, are provided.

According to another feature of present invention, a spirally shaped or coil-shaped antenna for generating an electromagnetic wave both to feed power to an IC card and to perform transmission and/or reception of a communication signal to and/or from the IC and a conductor member for forming a mirror image of the antenna to suppress an electric field intensity at a position at least 3 meters distant from the antenna.

According to still another aspect of the present invention, a power feeding system for feeding power, using electromagnetic waves, from a reader and/or writer apparatus to an IC card, for converting, in the IC card, the fed power to a D.C. voltage and for supplying this voltage to an internal circuit of the IC card, is provided wherein the reader and/or writer apparatus has a spirally shaped or coil-shaped antenna for generating an electromagnetic wave to feed power to the IC card and a conductor member for forming a mirror image of the antenna to suppress an electric field intensity at a position at least 3 meters distant from the antenna.

According to still another aspect of the present invention, a communication system for feeding power, using electromagnetic waves, from a reader and/or writer apparatus to an IC card and for performing transmission and/or reception of signals for communication to and/or from the IC card, is provided wherein the reader and/or writer apparatus has a spirally shaped or coil-shaped antenna for generating an electromagnetic wave both to feed power to the IC card and to perform transmission and/or reception of a communication signal to and/or from the IC and a conductor member for forming a mirror image of the antenna to suppress an electric field intensity at a position at least 3 meters distant from the antenna.

In order to achieve the second object, according to an aspect of the present invention, a power feeding system for feeding power, using electromagnetic waves, from a reader and/or writer apparatus to an IC card, for converting, in the IC card, the fed power to a D.C. voltage and for supplying this voltage to an internal circuit of the IC card, is provided wherein the outermost dimensions of a spirally shaped or coil-shaped antenna, provided in the reader and/or writer apparatus, for generating an electromagnetic field to supply operational power to the IC card is smaller than the outermost dimensions of a spirally shaped or coil-shaped image antenna formed in the IC card.

According to another aspect of the present invention, a communication system for feeding power, using electromagnetic waves, from a reader and/or writer apparatus to an IC card and for performing transmission and/or reception of signals for communication to and/or from the IC card, is provided wherein outermost dimensions of a spirally shaped or coil-shaped antenna, provided in the reader and/or writer apparatus, for generating electromagnetic waves both to supply operational power to the IC card and to perform transmission and/or reception of signals for communication to and/or from the IC card is smaller than outermost dimensions of a spirally shaped or coil-shaped image antenna formed in the IC card.

As has been explained above, according to the above-described configuration, in a reader and/or writer for feeding power to a proximate IC card, using electromagnetic waves (wireless), it is possible to feed, from an antenna of the reader and/or writer to the IC card, power which satisfies the requirements of the Radio Law in every direction and moreover operates the proximate IC card stably.

Also, according to the above-described configuration, in a power feeding system for feeding power from a reader and/or writer to a proximate IC card, using electromagnetic waves (wireless), it is possible to feed, from an antenna of the reader and/or writer to the IC card, power which satisfies the requirements of the Radio Law in every direction and moreover operates the proximate IC card stably.

Also, according to the above-described configuration, in a reader and/or writer for performing power feeding and communication to a proximate IC card, using electromagnetic waves (wirelessly) from a single antenna, it is possible to feed, from an antenna to the IC card, power which satisfies the requirements of the Radio Law in every direction and moreover operates the proximate IC card stably to thereby perform stable communication.

Also, as in the above-described configuration, by providing a conductor plate under the antenna, a shielding effect is achieved, which ensures stable operation free from the effect of the electromagnetic waves (noise) even if a high-frequency electronic circuit is provided further under the conductor plate.

As in the above arrangement, by making smaller the outermost size of the spirally shaped or coil-shaped antenna for generating an electromagnetic field to feed power to the IC card provided in the reader and/or writer apparatus than the outermost size of the spirally or coil-shaped antenna formed in the IC card, an error in the positioning of the IC card provided close to the antenna provided in the reader and/or writer apparatus is acceptable. It is preferable from a standpoint of the number of magnetic fluxes which are interlinked with the antenna of the IC card that the outermost periphery of the antenna of the IC card is $h$ or more larger than the outermost periphery of the antenna of the reader and/or writer apparatus where $h$ is a commnunication distance between the reader and/or writer apparatus and the IC card in a state where the center of the antenna of the reader and/or writer apparatus and the center of the antenna of the IC card conincide substantially.

DETAILED DESCRIPTION OF THE PREFERRED EMBODIMENTS

Embodiments of the present invention will be described next, using the accompanying drawings.

Described first will be a power feeding system for non-contact card operation and an antenna used therefor in a reader and/or writer of one of cash dispensers, electronic money, automatic ticket checking systems, and room entrance/exit control systems, etc., and an appropriate one of non-contact cards including cash cards, credit cards, passenger tickets, commuting tickets, coupon tickets, control cards, IC cards, licenses, telephone cards, highway toll cards and the like for use in the cash dispensers, electronic money, automatic ticket checking systems, and room entrance/exit control systems, etc.

Figure 1:
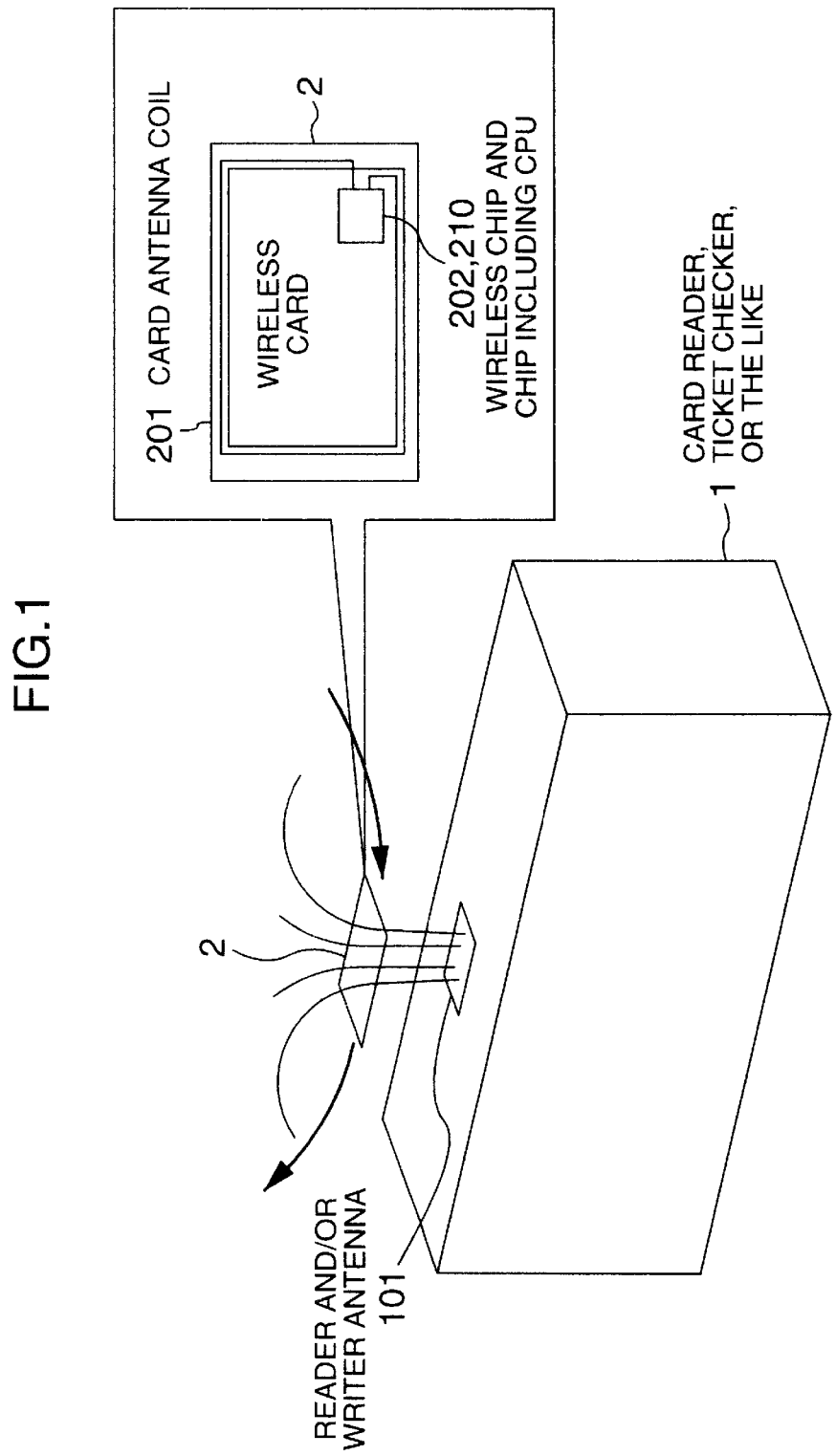
FIG. 1 is a perspective view of a schematic configuration of a power feeding and communication system for feeding power wirelessly and also for performing communication wirelessly from a reader and/or writer unit (apparatus) according to the present invention to a proximate wireless card (IC card).

FIG. 1 is a diagram illustrating a schematic configuration of a power feeding and communication system for feeding power and also performing communication from a reader and/or writer unit (apparatus) 1 according to the invention, for example, provided at a ticket checking gate, on a bus, at an entrance/exit or in a prescribed place, to a non-contact card 2 (proximate wireless card: IC card) which is caused to pass through the reader and/or writer in a non-contacting manner or be brought close to the reader and/or writer. The non-contact card (proximate wireless card: IC card) 2 serves as a cash card, credit card, passenger ticket, commuting ticket or the like as it is caused to pass by the reader and/or writer provided at a ticket checking gate, on a bus, or at an entrance/exit with the IC card being held by its user in a non-contacting manner, for example, at a distance of up to about 20 cm from the reader and/or writer unit 1 by transmitting and/or receiving wirelessly information on the cash card, credit card, passenger ticket, commuting ticket or the like to/from the reader and/or writer. The non-contact card (proximate wireless card: IC card) 2 may also be used without contacting with the reader and/or writer 1 in a roughly fixed position at a comparatively constant distance h of about a few cm or less from the reader and/or writer. In this case, by making the dimensions of a card antenna 201 formed on the proximate wireless card 2 greater than the dimensions of an R/W antenna 101 provided on the reader and/or writer unit 1, both power feeding and transmission and/or reception of communication are accomplished stably by using electromagnetic waves (wireless) consisting of a power feeding wave and a modulated wave for data communication between the reader and/or writer antenna 101 and the card antenna 201 even if the card antenna 201 deviates somewhat from the reader and/or writer antenna 101.

Figure 2:
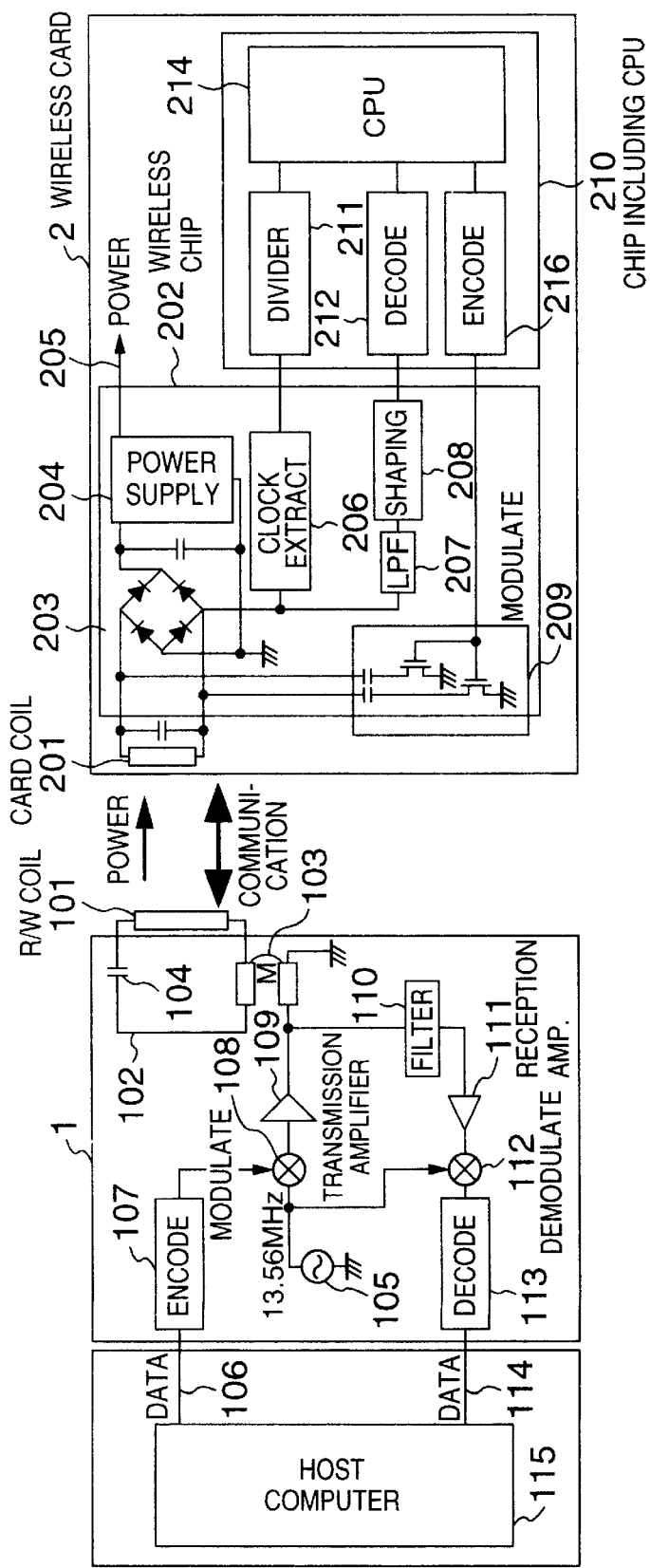
FIG. 2 is a schematic of one embodiment of an apparatus (system) for feeding electric power wirelessly and for performing communication wirelessly between the reader and/or writer apparatus and the proximate wireless card (IC card) according to the invention.

FIG. 2 is schematic of one embodiment of an apparatus (system) for feeding electric power wirelessly and for performing transmission and/or reception (communication) of information wirelessly between the reader and/or writer unit (apparatus) 1 and the non-contact card 2 (proximate wireless card: IC card) according to the invention. The embodiment of FIG. 2 illustrates performing both the feeding of power and the transmission and/or reception of communication using electromagnetic waves (wirelessly) consisting of a power feeding wave and a modulated wave for data communication illustrated in FIG. 3 between the reader and/or writer antenna provided in the reader and/or writer unit 1 and the card antenna 201 formed on the proximate wireless card 2. Although a power feeding wave and a signal wave in such ASK modulation system are different in frequency component in terms of frequency region, only the amplitude of the power feeding wave varies with the signal velocity in terms of time region. In other words, a modulated wave resulting from multiplying the signal wave by the power feeding wave only looks like the up and down fluctuations of the amplitude of the power feeding wave in terms of time region. Though it is conceivable to transmit the power feeding wave and the signal wave over separate antennas where the modulated wave is to be transmitted wirelessly, the inventive configuration is such that the field intensity is limited within the requirement of the Radio Law (500 µV/m at a distance of 3 m) and this modulated wave is transmitted over a single antenna (reader and/or writer antenna) 1 with a view to simplifying the non-contact card (proximate wireless card: IC card) 2.

Thus the reader and/or writer unit 1 is provided with a power supply source 105 for generating a voltage at a high frequency of 13.56 MHz; an encoding circuit 107 for encoding transmit data 106 inputted for transmission to the proximate wireless card 2; a modulator 108 for superposing (multiplying) amplitude modulation (Amplitude Shift Keying modulation) on (by) the high-frequency voltage of 13.56 MHz generated by the power supply source 105, using the signal encoded by the encoding circuit 107; a transmission amplifier 109 for amplifying the signal ASK-modulated on the high-frequency voltage of 13.56 MHz by the modulator 108; a matching circuit (power feeding circuit) 102 including a capacitor 104 for coupling by inductance coupling 103 the signal amplified via the transmission amplifier 109 thereto, to perform impedance matching to prevent reflection; the reader and/or writer antenna 101 for generating electromagnetic waves to feed power and transmit data to the card 2 depending on the output of the matching circuit 102 and for receiving data transmitted by an electromagnetic wave from the card antenna 201 of the proximate wireless card 2; a filter circuit 110 for having the signals received by the R/W antenna 101 matched in the matching circuit 102 and for removing noise components from the signal generated by the inductance coupling 103; a reception amplifier 111 for amplifying a signal obtained through the filter circuit 110; a demodulator 112 for demodulating the signal amplified by the reception amplifier 111, using the high-frequency voltage signal of 13.56 MHz obtained from the power supply circuit 105; and a decoding circuit 113 for decoding the signal demodulated by the demodulator 112 and for outputting them as receive data 114. The transmit data 106 and the receive data 114 are coupled to a host computer 115 via a network.

The non-contact card (proximate wireless card: IC card) 2 is provided with the card antenna 201 for receiving the electromagnetic waves generated from the reader and/or writer antenna 101 of the Reader and/or writer unit 1 to perform power feeding and data transmission, and for generating an electromagnetic wave corresponding to load switching-modulated transmit data; a wireless chip 202 having a matching and rectifying circuit 203 for rectifying the power of 13.56 MHz received by the card antenna 201 and for impedance-matching the transmit and/or receive signals, a power supply circuit 204 for supplying a constant D.C. voltage power supply 205 of about 2 to 5 V in about 5 mW from the rectified induced voltage from the matching and rectifying circuit 203, a clock extracting circuit 206 for extracting a clock signal from the receive signal obtained from the matching and rectifying circuit 203, an LPF circuit 207 for removing noise components from the receive signal obtained from the matching and rectifying circuit 203, a waveform shaping circuit 208 for waveform-shaping the receive signal obtained from the LPF circuit 207, and a load switching-modulating circuit 209 for load switching-modulating a transmit signal, for giving the modulated signal to the matching and rectifying circuit 203 for matching purposes and for supplying the matched signal to the card coil 201; and a chip 210 including a CPU (CPU+ interface) having a frequency dividing circuit 211 for generating a signal which is frequency-divided on the basis of the clock signal extracted by the clock extracting circuit 206 of the wireless chip 202 and for operating a microcomputer 214, a decoding circuit 212 for decoding the signal obtained from the waveform shaping circuit 208 of the wireless chip 202 and for inputting this signal to the microcomputer (CPU) 214 as decoded data (receive data), an encoding circuit 216 for encoding transmit data obtained from the microcomputer 214 and for inputting the encoded data to the load switching-modulating circuit 209 of the wireless chip 202, and the microcomputer (CPU) 214 of H8 or the like, with a built-in memory for storing information as a card, for processing transmit and/or receive data and for transferring data to and from the memory, and for receiving the stable power supply 205 from the power supply circuit 204 of the wireless chip 202.

The use of the reader and/or writer antenna 101 and the card antenna 201 for feeding power on an electromagnetic wave (wirelessly) is intended to improve the efficiency of power feeding by electromagnetic induction utilizing magnetic coupling. Where a spirally shaped antenna 201 is formed on the proximate wireless card 2, there is an advantage of resisting deformation of the proximate wireless card 2. Both the reader and/or writer antenna 101 and the card antenna 201 may take the form of a coil.

As has been described above, in the proximate wireless card system, by bringing the non-contact card (proximate wireless card: IC card) 2 close to the reader and/or writer 1, for example, at a comparatively constant distance h of about a few cm or less, power is fed wirelessly and also transmission/reception of information (communication) is also accomplished wirelessly between the reader and/or writer unit 1 and the non-contact card 2. Thus, in the proximate wireless card system, a power feeding wave or a communication wave is radiated from the reader and/or writer antenna 101, and this electromagnetic wave is received and induced by the spirally shaped or coil-shaped antenna 201 on the card side to operate the card side circuit to detect a signal.

Figure 4:
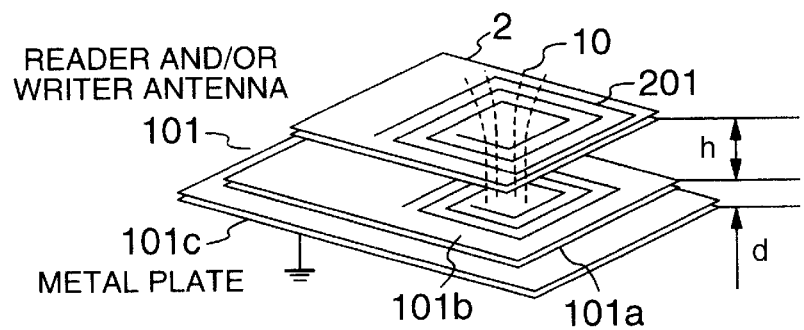
FIG. 4 illustrates the relationship between a reader and/or writer antenna provided in the reader and/or writer apparatus and the IC card according to the invention.

Now, in the proximate wireless card system, when the non-contact card (proximate wireless card: IC card) 2 is brought close to the reader and/or writer 1 at a comparatively constant distance h of about a few cm or less and used, as illustrated in FIG. 4, the spirally shaped antenna 101 to be used in the reader and/or writer 1 is configured by forming, over an insulating substrate 101a, a spirally shaped or coil-shaped antenna 101b of a filmy conductor having an outer rectangular shape whose outermost contour measures 25 mm to 75 mm. In this case, it is sufficiently small relative to a wavelength of 22 m determined by a service frequency of 13.56 MHz, and the current distribution on the antenna is considered to be substantially uniform. As a result, a high electric field and a high magnetic field are generated in the side and vertical directions, respectively, of the antenna.

In this case, if the non-contact card 2 with a spirally shaped or coil-shaped antenna 201 mounted in the vertical direction is brought at a distance h of about a few cm or less from the reader and/or writer, the power feeding wave or the signal wave can be transmitted/received. This communication distance can increase up to about 20 cm depending on the ability of the system. However, if the radiated electric field is limited to within the requirement of the Radio Law (500 µV/m at a distance of 3 m), the upper limit of the amperage to be fed to the spirally shaped antenna or coil 101b for the reader and/or writer is determined, the upper limit of the intensity of the magnetic field necessary for power feeding is determined, and hence the upper limit of power feeding is limited.

Therefore, it is desired that the antenna 101 to be used in the reader and/or writer 1 satisfy the requirement of the Radio Law (500 µV/m at a distance of 3 m) regarding the radiated electric field and moreover make possible sufficient power feeding to the non-contact card (proximate wireless card: IC card) 2.

Described next will be embodiments of the antenna 101 provided on the reader and/or writer 1 according to the present invention, which satisfies the requirement of the Radio Law (500 µV/m at a distance of 3 m) regarding the radiated electric field and moreover makes possible sufficient power feeding to IC card 2.

Figure 5:
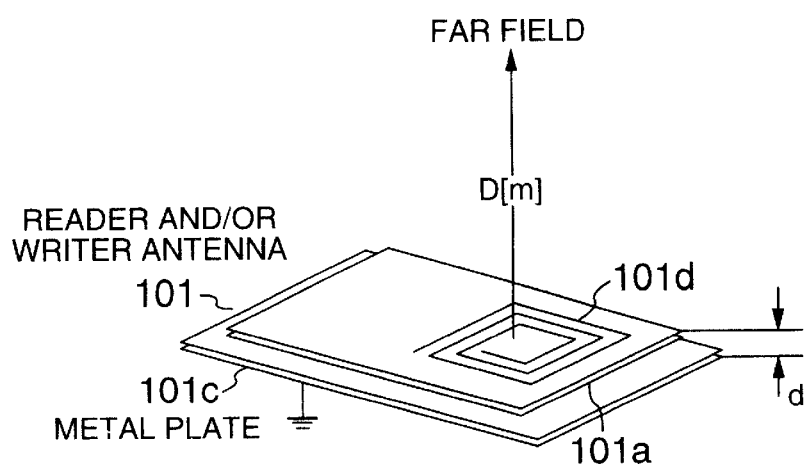
FIG. 5 is a perspective view of a first embodiment of the reader and/or writer antenna provided on the reader and/or writer according to the invention.

First will be described a first embodiment of the antenna 101 provided on the reader and/or writer 1 according to the invention. FIG. 5 illustrates the first embodiment of the antenna 101 provided on the reader and/or writer 1 according to the invention. As the first embodiment of the antenna 101 to be used on the reader and/or writer 1, it is configured by forming, on an insulating substrate 101a, the spirally shaped or coil-shaped antenna 101b of a filmy conductor having an outer rectangular shape whose outermost contour measures 25 mm to 75 mm, and providing, on the back side of this substrate 101a, a conductor plate (metal plate) 101c of Cu or the like, which forms a mirror image 91 of the antenna 101b at a close distance of d=about 20 mm or less to the antenna 101b. The conductor plate (metal plate) 101c is grounded to stabilize the electric potential. The conductor plate 101c is preferably made of a metal easy to form the mirror image 91 and having low resistance such as Cu or Al.

Figure 6:
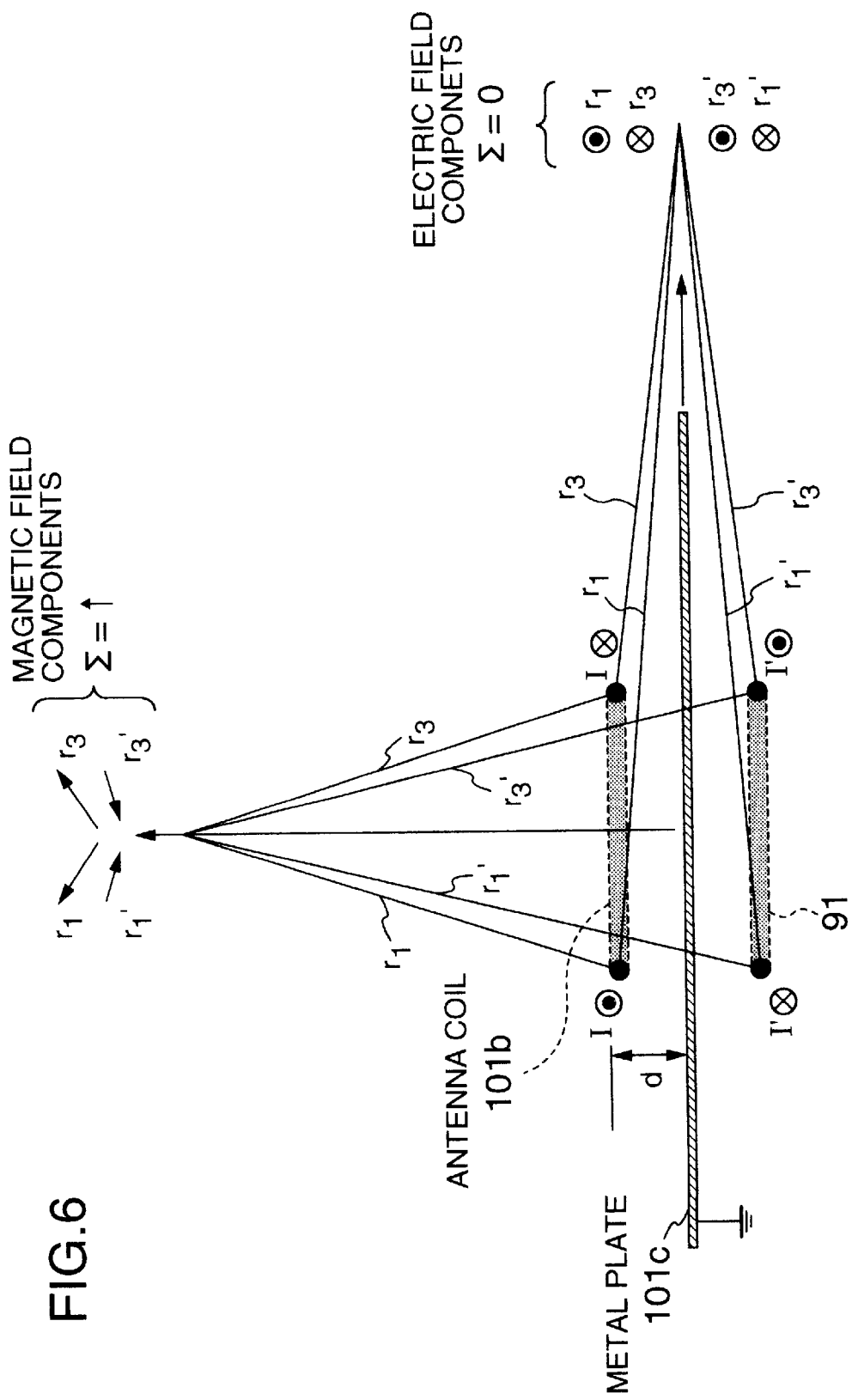
FIG. 6 is a diagram for explaining the principle of synthesizing magnetic fields in each of vertical direction and a side direction in the first embodiment of the reader and/or writer antenna.

As a result of the provision of this conductor plate (metal plate) 101c to form the mirror image 91 of the antenna 101b at the close distance of d=about 20 mm or less to the spirally shaped or coil-shaped antenna 101b, magnetic fields at points at distances of r1 and r3 from the sides of the antenna (loop antenna) 101b excited at 13.56 MHz in a vertical direction to cause a current I to flow through the antenna and magnetic fields at points at distances of r1' and r3' from the sides of the mirror image 91 formed at a distance of 2d from the antenna (loop antenna) 101b are synthesized as shown in FIG. 6.

Figure 7:
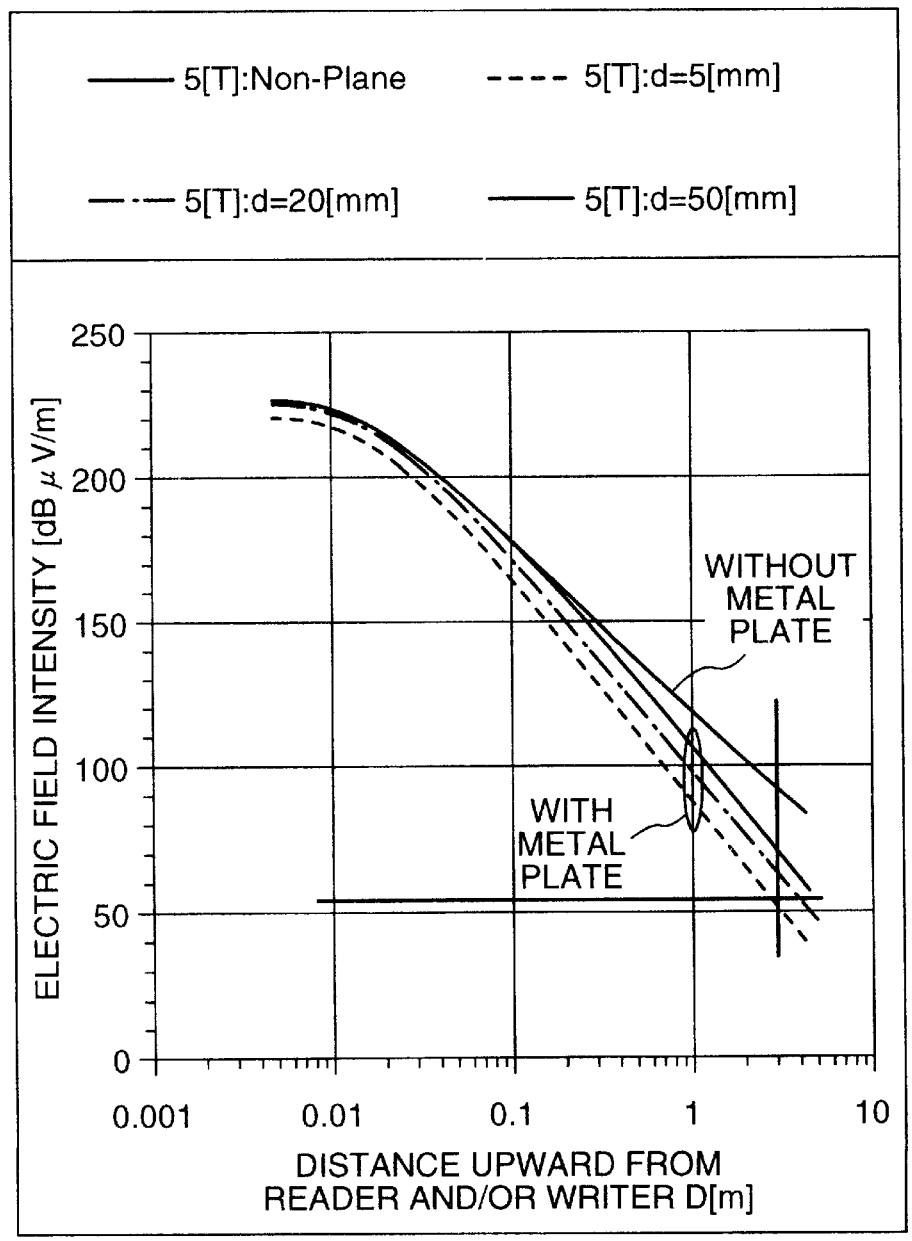
FIG. 7 is a diagram of a simulated field strength with a vertical distance from a reader and/or writer antenna of the first embodiment.

The magnetic field at a distance of D[m] upward from the reader and/or writer is measured with a measuring loop antenna (a square loop antenna of which each side is 61.6 cm long), and its field intensity equivalent ($\omega \mu SHz \times AF$)[dBuV/m] is obtained, as illustrated in FIG. 7. FIG. 7 shows, with the spirally shaped or coil-shaped antenna (loop antenna) 101b, of which the maximum external dimensions are 30 mm×30 mm, the number of turns [T] is 5 and the current Is=1.0 [Arms], the result of simulation of the relationship between the distance D[m] upward from the reader and/or writer and the field intensity [dBuV/m] at that distance with respect to a case in which the conductor plate (metal plate) 101c is absent and to cases in which the conductor plate (metal plate) 101c is present and d=5 [mm], d=20 [mm], and d=50 [mm]. FIG. 7 shows that where the conductor plate (metal plate) 101c is present, the field intensity is reduced more conspicuously, as the upward distance D increases, than where the conductor plate (metal plate) 101c is absent. As the distance d between the loop antenna 101b and the metal plate 101c decreases from 50 [mm] through 20 [mm] to 5 [mm], the field intensity is reduced when the upward distance D is large.

The Radio Law requires that the field intensity at D=3 [m] be 54 [dBuV/m].

Therefore, if, at D=3 [m], the distance d between the loop antenna 10b and the metal plate 101c is set at 5 [mm] or less, the field intensity is reduced by at least 41 [dBuV/m] compared to the case where the metal plate is absent.

Then, if, for instance, the distance d between the loop antenna 101b and the metal plate 101c is set at 5 [mm] or less, and when the distance between the loop antenna 101b and the IC card 2 is set at a few cm or less, it is possible to feed power from the loop antenna 101b to the card antenna 201 until the electric field intensity is up to about 190 [dBuV/m] or more. If, for example, the distance d between the loop antenna 101b and the metal plate 101c is set at 20 [mm], and when the distance between the loop antenna 101b and the IC card 2 is set at a few cm or less, it is possible to feed power from the loop antenna 101b to the card antenna 201 until the field intensity is up to about 180 [dBuV/m] or more.

In order to satisfy the requirement of the Wireless Telegraphy Act (54 [dBuV/m] at D=3 [m])in the absence of the metal plate, it will be necessary to bring down the field intensity based on the power fed from the loop antenna 101b to the card antenna 201 to about 120 [dBuV/m] or less. However, by installing the metal plate 101c on the back side of the loop antenna 101b as stated above, the requirement of the Wireless Telegraphy Act regarding the radiated field intensity (500 μ/Vm at a distance of 3 m) is satisfied and sufficient power is fed to the IC card 2.

Figure 8:
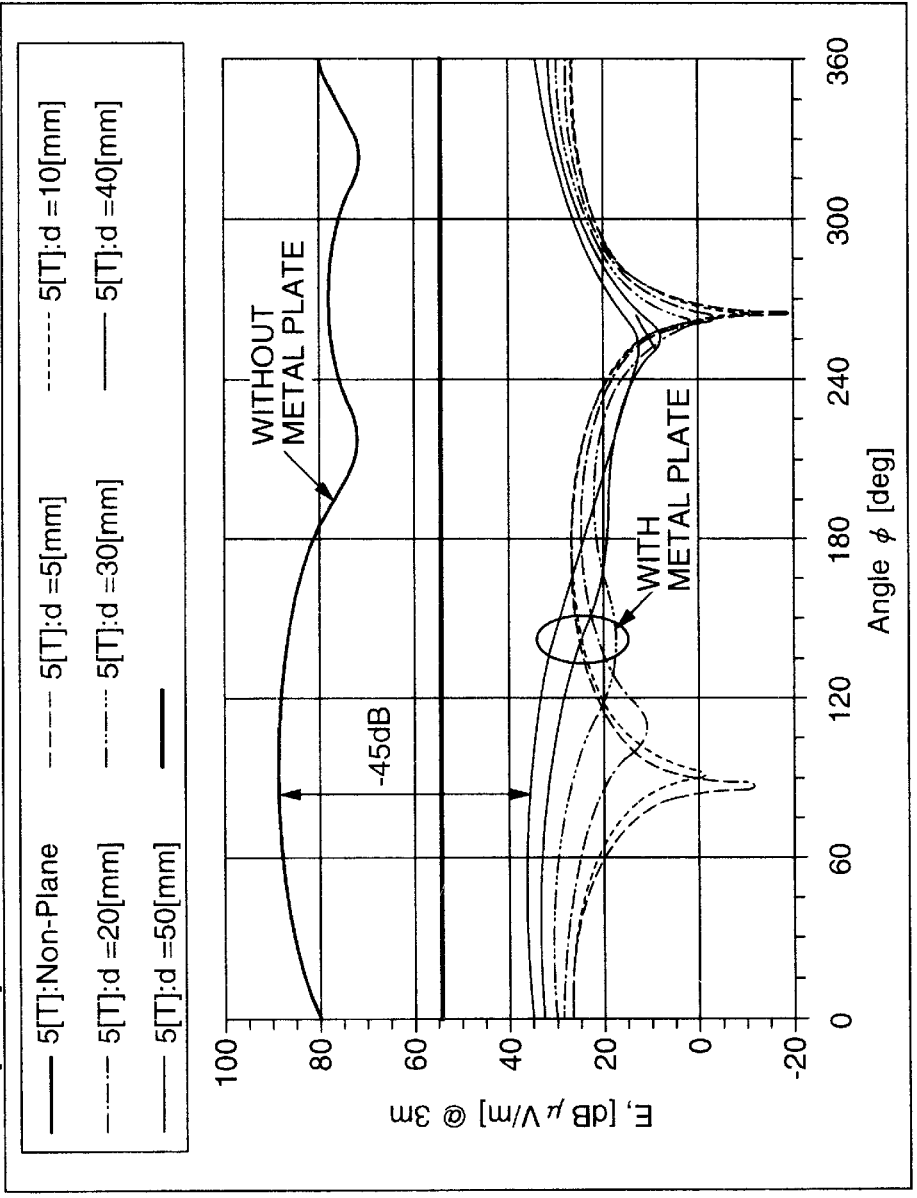
FIG. 8 is a diagram of a simulated field intensity in a position 3 [m] spaced sideways from the reader and/or writer antenna of the first embodiment.

Also, as illustrated in FIG. 6, by the provision of the conductor plate (metal plate) 101c to form the mirror image 91 of the antenna 101b at a close distance of d=about 20 mm or less to the spirally shaped or coil-shaped antenna 101b, electromagnetic fields (mainly electric fields) at points at distances of r1 and r3 from the sides of the antenna (loop antenna) 101b excited at 13.56 MHz in a side direction to cause a current I to flow through the antenna, and electromagnetic fields (mainly electric fields) at points at distances of r1' and r3' from the sides of the mirror image 91 formed at a distance of 2d from the spirally shaped or coil-shaped antenna (loop antenna) 101b are synthesized. Thus, a field intensity of [dBuV/m] in a position 3[m] sideways from the loop antenna 101b is as shown in FIG. 8. FIG. 8 also shows, with the spirally shaped or coil-shaped antenna (loop antenna) 101b, of which the maximum external dimensions are 30 mm×30 mm, the number of turns [T] is 5, and the current Is=1.0 [Arms], the result of simulation of the relationship of the field intensity [dBuV/m] in a position 3 [m] sideways from the loop antenna 101b to an angle φ around the loop antenna 101b with respect to a case in which the conductor plate (metal plate) 101a is absent and cases in which the conductor plate (metal plate) 101c is present and d=5 [mm], d=10 [mm], d=20 [mm], d=30 [mm], d=40 [mm], and d=50 [mm]. As shown in FIG. 8, where the conductor plate (metal plate) 101c is present, the field intensity is reduced by a minimum of 45 [dBuV/m] even when d=50 [mm] compared to the case where the conductor plate (metal plate) 101c is absent. Thus, by providing the metal plate 101c on the back side of the loop antenna 101b, the requirement of the Radio Law (54 [dBuV/m] of field intensity at D=3 [m]) is readily satisfied in the side direction rather than in the vertical direction from the loop antenna 101b.

Similar values to the results of simulation regarding the field intensity in the presence and absence of the metal plate in FIGS. 7 and 8 were confirmed in experiments.

As has been described above, by providing the metal plate 101c on the back side of the loop antenna 101b, it is ensured that the radiated electric field satisfies the requirement of the Wireless Telegraphy Act (500 dBuV/m at D=3 m) in every direction of the loop antenna 101b and, moreover, that sufficient power is fed to the card antenna 201 of the IC card 2.

Obviously, a field intensity for the modulated wave for data communication radiated from the loop antenna 101b readily satisfies the requirement of the Radio Law (500 dBuV/m at D=3 m) because it is lower than the power feeding wave.

Figure 9:
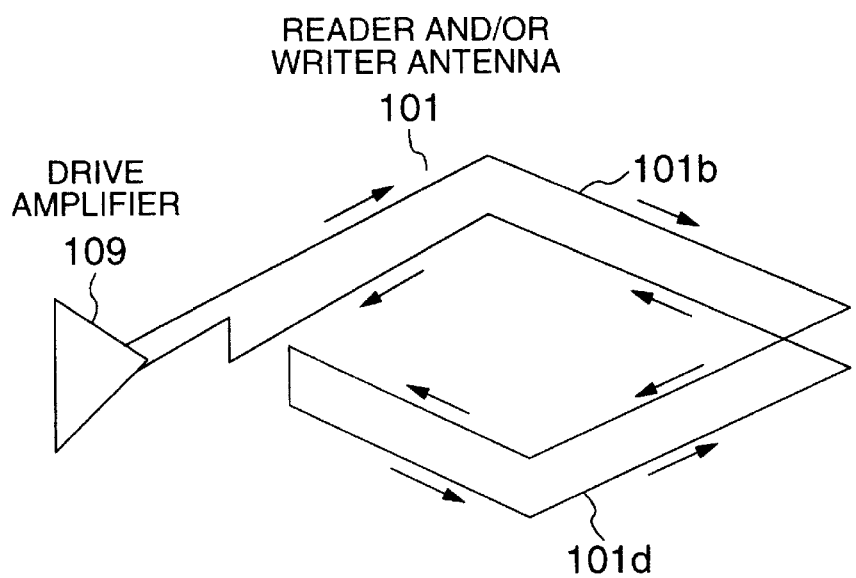
FIG. 9 is a perspective view of a second embodiment of the reader and/or writer antenna provided on the reader and/or writer apparatus according to the invention.

Described next will be a second embodiment of the antenna 101 provided on the reader and/or writer 1 according to the present invention. FIG. 9 illustrates the basic concept of the second embodiment of the antenna 101, which is configured by connecting a spirally shaped or coil-shaped image antenna (image loop antenna) 101d to a spirally shaped or coil-shaped antenna 101b in its mirror image position. As shown in FIG. 9, the current to flow through the antenna 101b and the current to flow through the image antenna 101d are made inverse in direction to each other. By using such configuration, it is ensured that the image antenna 101d performs the same function as the mirror image 91, which is formed by the metal plate 101c in the first embodiment, that the radiated electric field satisfies the requirement of the Wireless Telegraphy Act (500 dBuV/m at D=3 m) in every direction of the loop antenna 101b and, moreover, that sufficient power is fed to the card antenna 201 of the IC card 2. In this case, it is necessary to coordinate the high-frequency current of 13.56 MHz to flow through the antenna 101b and the high-frequency current of 13.56 MHz to flow through the image antenna 101d to be either the same in direction and reverse in phase, or reverse in direction and the same in phase. Therefore, it is necessary to determine the coil lengths so that the high-frequency current of 13.56 MHz to flow through the antenna 101b coincides in phase with the high-frequency current of 13.56 MHz to flow through the image antenna 101d.

Figure 10:
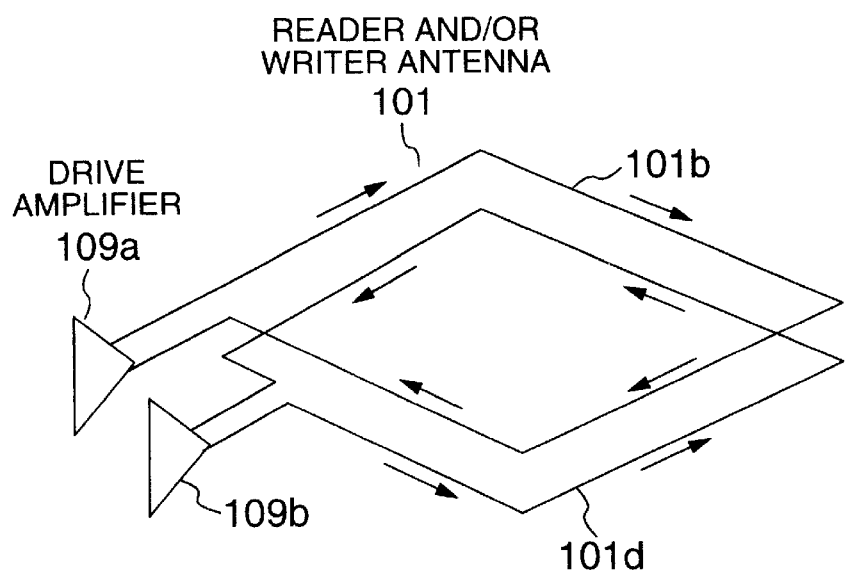
FIG. 10 is a perspective view of a modification of the second embodiment of the reader and/or writer antenna provided on the reader and/or writer apparatus according to the invention.

FIG. 10 is a perspective view of an example in which the antenna 101b and the image antenna 101d are driven by separate amplifiers 109a and 109b, respectively. By using such configuration and inputting high-frequency signals of the same 13.56 MHz to the drive amplifiers 109a and 109b, the currents to flow through the antennas 101b and 101d easily coincide in phase.

As has been described above, while the first embodiment prevents generation of a magnetic field on the back side of the metal plate 101c, the second embodiment allows generation of a similar magnetic field to that on the front side on the back side of the image antenna 101d. If this magnetic field causes trouble, it will be necessary to provide a conductor plate such as a metal plate on the back side of the image antenna 101d to thereby prevent a generated magnetic field from reaching an area remote from the back side of the image antenna 101d.

Figure 3:
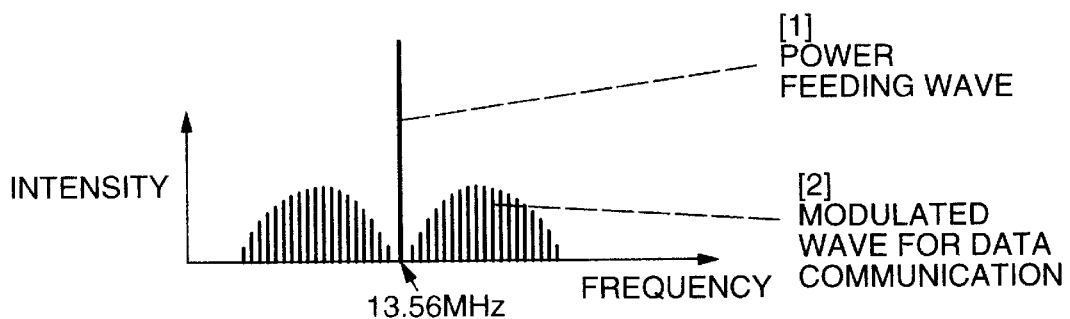
FIG. 3 illustrates the relationship between a power feeding wave and a modulated wave for data communication according to the invention.

Further, while both the feeding of power and the transmission/reception of communications using electromagnetic waves (wireless) shown in FIG. 3 consisting of a power feeding wave and a modulated wave for data communication, between the reader and/or writer antenna 101 provided on the Reader and/or writer unit 1 and the card antenna 201 formed on the IC card 2 have been described in the first second embodiments mentioned above, the present invention is also effective in the feeding of power using an electromagnetic wave consisting only of a power feeding wave. For communication in this case, transmission/reception is performed using antennas provided separately for the reader and/or writer unit 1 and the IC card 2.

Next, the relationship between the sizes of the antenna 101b and metal plate 101c which satisfies the requirement of the Radio Law at a distance of 3 m and the distance between the antenna 101b and metal plate 101c will be described.

Figure 11:
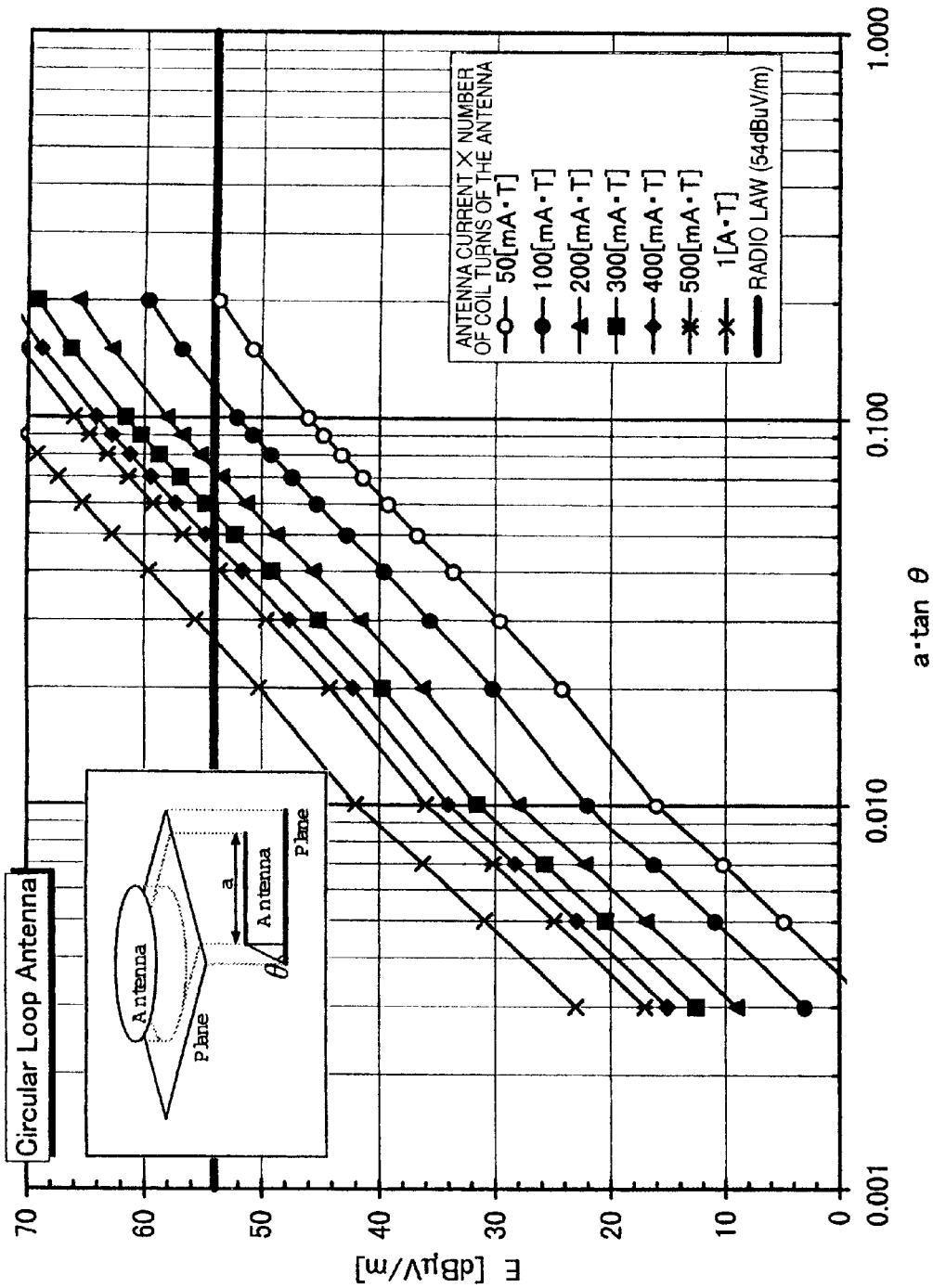
FIG. 11 is a diagram of a simulated electric field intensity 3 meters spaced from a reader and/or writer circular-loop antenna with a conductor plate disposed.

FIG. 11 shows a result of an experiment on an electric field intensity E generated at a distance of 3 m from a reader and/or writer which is provided with a circular antenna 101b having a radius of a[m] and a conductor plate 101c provided on the back of the antenna 101b when a·tan θ which prescribes the relationship between the sizes of the antenna 101b and metal plate 101c and the distance between the antenna 101b and metal plate 101c was changed. Note that the relationship a·tan θ represents a ratio of the distance between the antenna 101b and the metal plate 101c to a dimension of that portion of the metal plate 101c which extends further from the footprint of the antenna 101b. FIG. 11 also shows a result of an experiment on each of products of a current which flows through the antenna and its number of turns.

As will be seen in FIG. 11, as a·tan θ increases, or the product of the antenna current and its number of turns increases, the electric field intensity E increases. Thus, a·tan θ is required to be 0.2 or less in order to maintain an electric field intensity E at a distance of 3 m from a reader and/or writer of 50 [ma·T] or more lower than 54 dBuV/m or less which is prescribed by the Radio Law.

While in FIG. 11 the experiment (simulation) was performed, using antennas of sizes a=0.03, 0.05, 0.07, 0.10, 0.15 and 0.20 [m], even use of antennas of other sizes indicate substantially the same characteristics as those of FIG. 11 if the length of the antenna line is 3 cm–3 m because the length of the antenna line is negligible compared to the wavelength (22 m) (13.56 MHz) of the power feeding wave applied to the reader and/or writer. This applies likewise to results of the following experiments.

Figure 12:
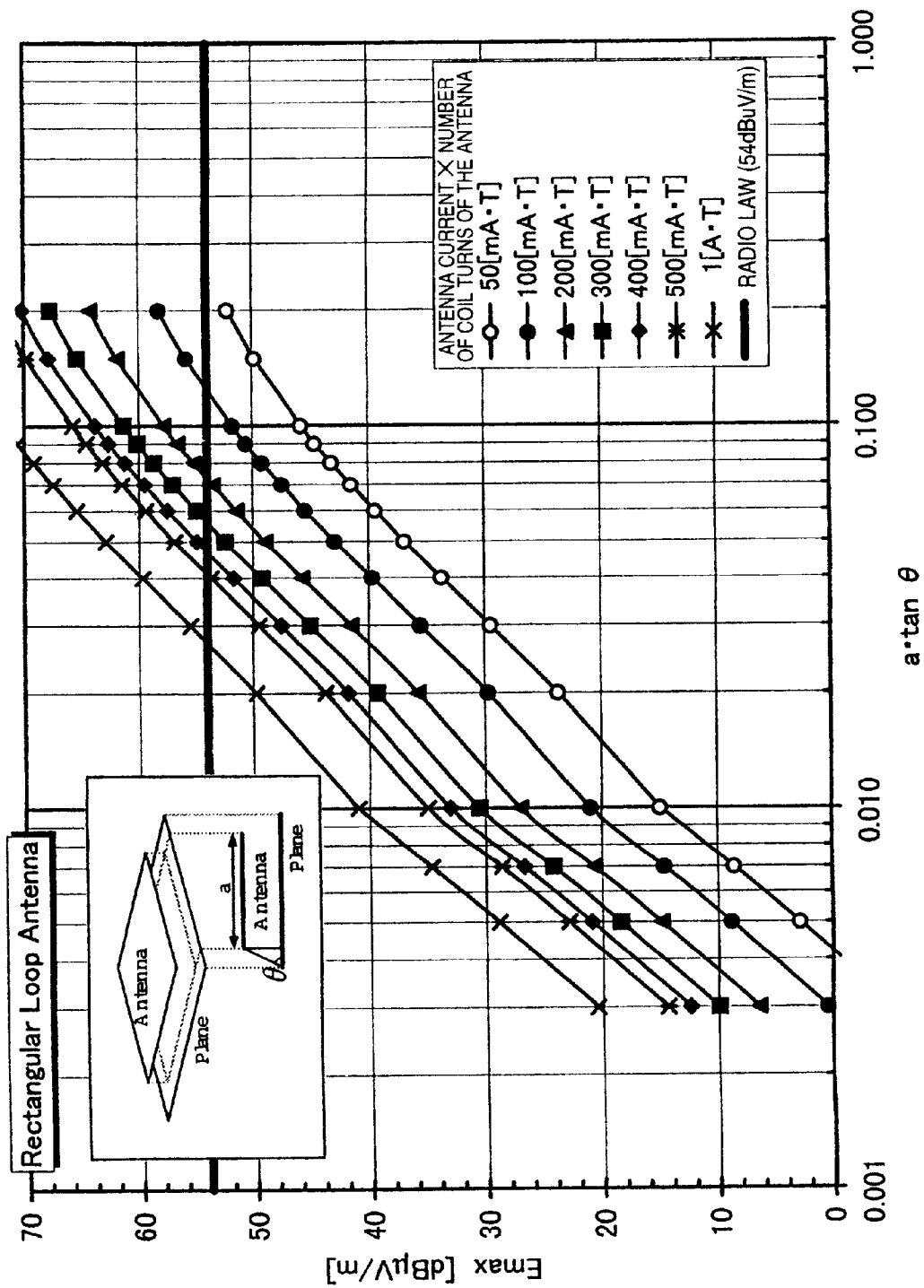
FIG. 12 is a diagram of a simulated electric field intensity 3 meters spaced from a reader and/or writer rectangular-loop antenna with a conductor plate disposed.

FIG. 12 shows a result of an experiment on an electric field intensity E generated at a distance of 3 m from a reader and/or writer which is provided with a rectangular antenna 101b having a side of a [m] and a conductor plate 101c provided on the back of the antenna 101b when a tan e which prescribes the relationship between the sizes of the antenna 101b and metal plate 101c and the distance between the antenna 101b and metal plate 101c was changed. FIG. 12 also shows a result of an experiment on each of products of a current which flows through the antenna and its number of turns.

As will be seen in FIG. 12, as a·tan θ increases, or the product of the antenna current and its number of turns increases, the electric field intensity E increases. Thus, a·tan θ is required to be 0.2 or less in order to maintain an electric field intensity E at a distance of 3 m from a reader and/or writer of 50 [ma·T] or more lower than 54 dBuV/m or less which is prescribed by the Radio Law.

As will be seen from the comparison of FIGS. 11 and 12, the electric field intensity E does not extremely change depending on the shape of the antenna used, but relates to an area (through which the magnetic flux passes) formed by the outermost component of the antenna. Thus, in the case of other antenna shapes, the a·tan θ is required to be 0.2 or less in a cross section of a place where the distance between the conductor plate edge 101c and the outermost component of the antenna 101b is minimum.

With the antenna like those of FIGS. 11 and 12, it has been confirmed that a satisfactory magnetic field intensity is obtained at a distance of about 20 cm or less from the reader and/or writer on the basis of its antenna current and its number of turns.

According to the present invention, in a reader and/or writer which feeds power to a proximate IC card, using an electromagnetic wave (wirelessly), it is possible to feed power which satisfies the requirement of the Radio Law in every direction of the antenna and moreover operates the proximate IC card stably.

Also, according to the invention, in a power feeding system which feeds power from a reader and/or writer to a proximate IC card, using an electromagnetic wave (wireless), it is possible to feed to the IC power which satisfies the requirement of the Radio Law in every direction of the antenna and moreover operates the proximate IC card stably.

Also, according to the invention, in a reader and/or writer which feeds power to and communicates with a proximate IC card, using an electromagnetic wave (wirelessly) radiated by a single antenna, it is possible to feed to the IC card power which satisfies the requirement of the Radio Law in every direction of the antenna and operates the proximate IC card stably to thereby perform stable communication with the IC card.

Also according to the invention, there is achieved, by providing a conductor plate under the antenna, a shielding effect which ensures, even if a high-frequency electronic circuit is configured further under the high-frequency electronic circuit, stable operation of the electronic circuit not subject to the effect of electromagnetic waves (noise).

What is claimed is:

1. A reader and/or writer apparatus comprising a spirally shaped or coil-shaped antenna lying substantially in a plane for generating an electromagnetic field to supply power to an IC card and a conductor member for forming a mirror image of the antenna, the conductor member being disposed in a plane substantially parallel to the plane of the spirally shaped or coil-shaped antenna.

2. A reader and/or writer apparatus comprising a spirally shaped or coil-shaped antenna to communicate with a non-contact IC card and a conductor member to form a mirror image of the antenna, wherein an electromagnetic field generating from the antenna and an electromagnetic field of the mirror image are reverse in phase to one another.

3. The reader and/or writer apparatus according to claim 2, comprising a power supply for generating a signal for power supplying, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power supplying circuit for supplying power to an antenna on the basis of a signal obtained from the modulator.

4. A reader and/or writer apparatus comprising a spirally shaped or coil-shaped antenna for generating an electromagnetic field to supply power to an IC card and a spirally shaped or coil-shaped image antenna which constitutes a mirror image of the spirally shaped or coil-shaped antenna, wherein a current flowing through the image antenna and a current flowing through the antenna are the same in direction and reverse in phase to one another, or reverse in direction and the same in phase to one another.

5. A reader and/or writer apparatus comprising a spirally shaped or coil-shaped antenna to communicate with an IC card and a spirally shaped or coil-shaped image antenna which constitutes a mirror image of the spirally shaped or coil-shaped antenna, wherein a current flowing through the image antenna and a current flowing through the antenna are the same in direction and reverse in phase to one another, or reverse in direction and the same in phase to one another.

6. The reader and/or writer apparatus according to claim 5, comprising a power supply for generating a signal for power supplying, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power supplying circuit for supplying power to an antenna and an image antenna on the basis of a signal obtained from the modulator.

7. A power supplying system for supplying power, using electromagnetic waves, from a reader and/or writer apparatus to an IC card, the IC card having a circuit for converting the supplied power to a D.C. voltage and for supplying said D.C. voltage to an internal circuit of the IC card, the reader and/or writer apparatus having a spirally shaped or coil-shaped antenna lying substantially in a plane for generating an electromagnetic field to supply power to the IC card and a conductor member for forming a mirror image of the antenna, the conductor member being disposed in a plane substantially parallel to the plane of the spirally or coil-shaped antenna.

8. A communication system having an IC card and a reader and/or writer apparatus, the reader and/or writer apparatus having a spirally shaped or coil-shaped antenna to communicate with the IC card and a conductor member to form a mirror image of the antenna, wherein an electromagnetic field generating from the antenna and an electromagnetic field of the mirror image are reverse in phase to one another.

9. The communication system according to claim 8, wherein said reader and/or writer apparatus includes a power supply for generating a signal for power supplying, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power supplying circuit for supplying power to an antenna on the basis of a signal obtained from the modulator.

10. A power supplying system for supplying power, using electromagnetic waves, from a reader and/or writer apparatus to an IC card, the IC card having a circuit for converting the supplied power to a D.C. voltage and for supplying this voltage to an internal circuit of the IC card, the reader and/or writer apparatus having a spirally shaped or coil-shaped antenna for generating an electromagnetic field to supply power to the IC card and a spirally shaped or coil-shaped image antenna which constitutes a mirror image of the spirally shaped or coil-shaped antenna, wherein a current flowing through the image antenna and a current flowing through the antenna are the same in direction and reverse in phase to one another, or reverse in direction and the same in phase to one another.

11. A communication system having an IC card and a reader and/or writer apparatus, the reader and/or writer apparatus having a spirally shaped or coil-shaped antenna to communicate with the IC card and a spirally shaped or coil-shaped image antenna which constitutes a mirror image of the spirally shaped or coil-shaped antenna, wherein a current flowing through the image antenna and a current flowing through the antenna are the same in direction and reverse in phase to one another, or reverse in direction and the same in phase to one another.

12. The communication system according to claim 11, wherein said reader and/or writer comprises a power supply for generating a signal for power supplying, an encoding circuit for encoding inputted transmit data, a modulator for amplitude-modulating the signal obtained from the power supply with a signal obtained from the encoding circuit so that the signal obtained from encoding circuit is superimposed on the signal obtained from the power supply, and a power supplying circuit for supplying power to an antenna and an image antenna on the basis of a signal obtained from the modulator.

13. A power supplying system for supplying power, using electromagnetic waves, from a reader and/or writer apparatus to an IC card, the IC card having a circuit for converting the supplied power to a D.C. voltage and for supplying said voltage to an internal circuit of the IC card, the outermost dimensions of a spirally shaped or coil-shaped antenna of the reader and/or writer apparatus being smaller than the outermost dimensions of a spirally shaped or coil-shaped image antenna of the IC card.

14. A communication system having an IC card and a reader and/or writer apparatus, outermost dimensions of a spirally shaped or coil-shaped antenna of the reader and/or writer apparatus being smaller than outermost dimensions of a spirally shaped or coil-shaped image antenna of the IC card.

15. A reader and/or writer apparatus comprising an antenna for generating an electromagnetic wave to supply power to an IC card, and a conductor member disposed so that $a \cdot \tan \theta$ is 0.2 or less where a is a dimension of the antenna in a position where the distance between an outermost element of the antenna and an edge of the conductor member is minimum and $\theta$ is an angle formed between the conductor member and a line which connects the outermost component of the antenna with the edge of the conductor member.

16. The reader and/or writer apparatus according to claim 15, wherein the antenna both supplies power to the IC card and performs transmission of a communication signal to the IC card and/or reception of a communication signal from the IC card.

17. A power supplying system for supplying power, using electromagnetic waves, from a reader and/or writer apparatus to an IC card, the IC card having a circuit for converting the supplied power to a D.C. voltage and for supplying the D.C. voltage to an internal circuit of the IC card, the reader and/or writer apparatus having a spirally shaped or coil-shaped antenna for generating an electromagnetic field to supply power to the IC card and a conductor member disposed so that $a \cdot \tan \theta$ is 0.2 or less where a is a dimension of the antenna in a position where the distance between an outermost component of the antenna and an edge of the conductor member is minimum and $\theta$ is an angle formed between the conductor member and a line which connects the outermost component of the antenna with the edge of the conductor member.

18. A communication system for supplying power, using electromagnetic waves, from a reader and/or writer apparatus to an IC card and for performing transmission of a communication signal to the IC card and/or reception of a communication from the IC card, the reader and/or writer apparatus having an antenna for generating an electromagnetic wave to supply power to the IC card, and a conductor member disposed so that $a \cdot \tan \theta$ is 0.2 or less where a is a dimension of the antenna in a position where the distance between an outermost element of the antenna and an edge of the conductor member is minimum and $\theta$ is an angle formed between the conductor member and a line which connects the outermost component of the antenna with the edge of the conductor member.

19. A reader and/or writer apparatus comprising a spirally shaped or coil-shaped antenna for generating an electromagnetic wave to supply power to an IC card and a conductor member for forming a mirror image of said antenna to suppress an electric field intensity at a position distant from said antenna.

20. A reader and/or writer apparatus comprising a spirally shaped or coil-shaped antenna for generating an electromagnetic wave to communicate with an IC card and a conductor member for forming a mirror image of said antenna to suppress an electric field intensity at a position distant from said antenna.

21. A power supplying system for supplying power, using electromagnetic waves, from a reader and/or writer apparatus to an IC card, the IC card having a circuit for converting the supplied power to a D.C. voltage and for supplying the voltage to an internal circuit of the IC card, the reader and/or writer apparatus having a spirally shaped or coil-shaped antenna for generating an electromagnetic wave to supply power to the IC card and a conductor member for forming a mirror image of said antenna to suppress an electric field intensity at a position distant from said antenna.

22. A communication system having an IC card and a reader and/or writer apparatus, the reader and/or writer apparatus having a spirally shaped or coil-shaped antenna to generate an electromagnetic wave to communicate with the IC and a conductor member to form a mirror image of said antenna to suppress an electric field intensity at a position distant from said antenna.

23. The reader and/or writer apparatus according to claim 1, wherein said IC card is a non-contact proximate wireless IC card.

24. The reader and/or writer apparatus according to claim 2, wherein said conductor member is disposed in a plane which is substantially parallel to a plane of the spirally shaped or coil-shaped antenna.

25. The reader and/or writer apparatus according to claim 5, said spirally shaped or coil-shaped image antenna is disposed in a plane which is substantially parallel to a plane of the spirally shaped or coil-shaped antenna.

26. The communication system according to claim 8, wherein said conductor member is disposed in a plane which is substantially parallel to a plane of the spirally shaped or coil-shaped antenna.

27. The communication system according to claim 11, said spirally shaped or coil-shaped image antenna is disposed in a plane which is substantially parallel to a plane of the spirally shaped or coil-shaped antenna.

28. The reader and/or writer apparatus according to claim 19, wherein said conductor member is disposed in a plane which is substantially parallel to a plane of the spirally shaped or coil-shaped antenna.

29. The communication system according to claim 22, wherein said conductor member is disposed in a plane which is substantially parallel to a plane of the spirally shaped or coil-shaped antenna.

* * * * *